United States Patent [19]

Bradfield et al.

[11] Patent Number: 4,709,880
[45] Date of Patent: * Dec. 1, 1987

[54] METHOD AND SYSTEM FOR IMPROVED V/STOL AIRCRAFT PERFORMANCE

[75] Inventors: Ganey W. Bradfield, Fort Worth; Glynn P. Cragin, Jr., Irving, both of Tex.

[73] Assignee: General Dynamics Corporation, Fort Worth, Tex.

[*] Notice: The portion of the term of this patent subsequent to Nov. 24, 1998 has been disclaimed.

[21] Appl. No.: 684,209

[22] Filed: Dec. 20, 1984

Related U.S. Application Data

[63] Continuation-in-part of Ser. No. 974,589, Dec. 29, 1978, Pat. No. 4,301,980, and a continuation-in-part of Ser. No. 296,710, Aug. 27, 1981, Pat. No. 4,505,443.

[51] Int. Cl.$^4$ ............................................. B64C 15/02
[52] U.S. Cl. ..................................... 244/12.5; 244/15
[58] Field of Search .................... 244/12.1, 12.4, 12.5, 244/23 D, 23 R, 52, 55, 207, 211, 212, 216, 15; 239/265.19, 265.27; 60/228, 229, 230

[56] References Cited

U.S. PATENT DOCUMENTS

| | | | |
|---|---|---|---|
| 3,262,645 | 7/1966 | Veno, Jr. ......................... | 239/265.19 |
| 3,299,638 | 1/1967 | Santamaria et al. ........... | 239/265.19 |
| 3,397,854 | 8/1968 | Reyle ................................... | 244/216 |
| 4,358,074 | 11/1982 | Schoen et al. ...................... | 244/12.5 |

FOREIGN PATENT DOCUMENTS

2016391  9/1979  United Kingdom ............... 244/12.5

*Primary Examiner*—Joseph F. Peters, Jr.
*Assistant Examiner*—Rodney A. Corl
*Attorney, Agent, or Firm*—James C. Fails; Charles E. Schurman

[57] ABSTRACT

A method and system for improved performance of a V/STOL aircraft characterized by directing a major portion of exhaust gas flow from a propulsion system through a closed conduit means to exit through a thrust producing primary nozzle that includes turning apparatus for forming a bend for the exhaust flow downstream of the propulsion source; turning the exhaust flow while simultaneously bleeding-off through at least one secondary nozzle a second and minor portion of the exhaust flow from an outer portion of the bend downstream of the bend leasing edge to reduce the vortex formation in the bend and directing the bleed-off and exhaust flows adjacent each other and oriented in the same direction in all flight modes for recovery of the maximum thrust potential. Also disclosed are preferred embodiments of the respective source of propulsion, primary and secondary thrust nozzles, flaps and orientation of the secondary thrust nozzles adjacent the flaps for improved performance because of preventing of the formation of the thrust inhibiting vortices in the turn and the improved lift and prevention of boundary layer separation of the flow over the flap surfaces providing lift.

23 Claims, 12 Drawing Figures

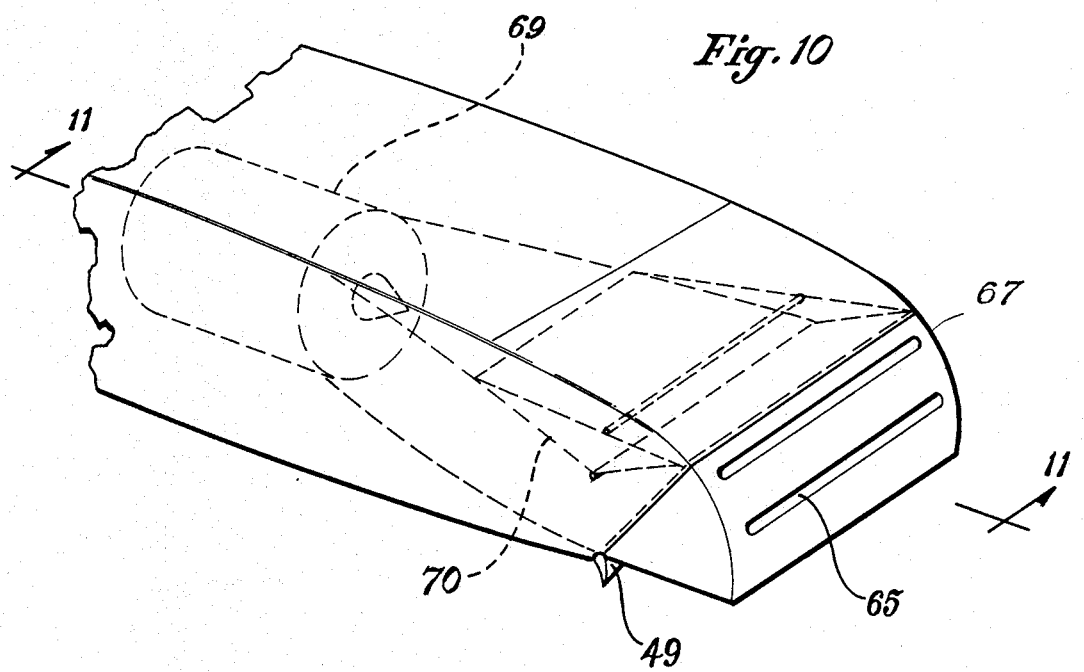
Fig. 10
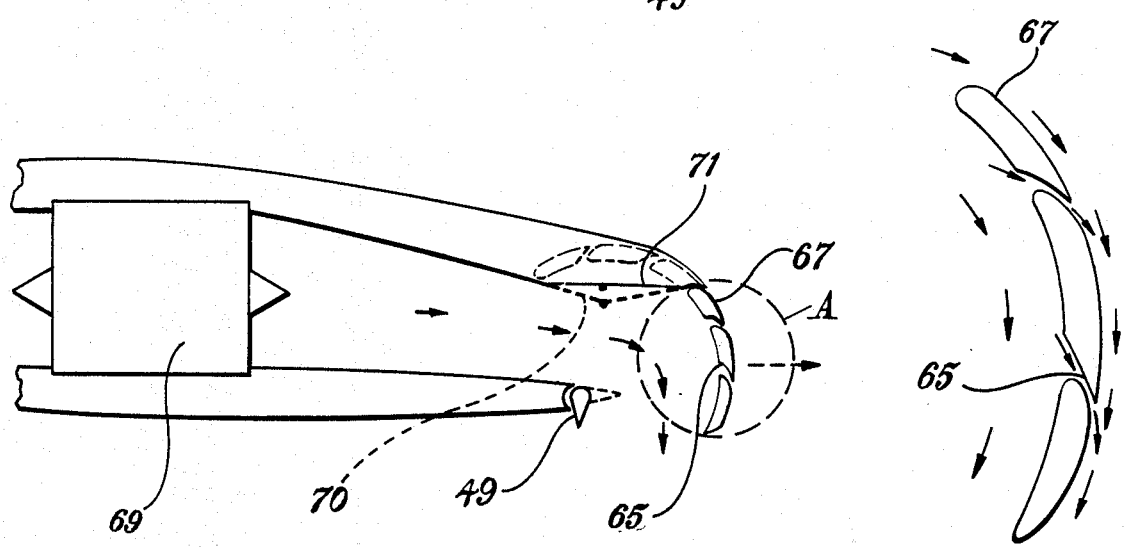
Fig. 11
Fig. 12

METHOD AND SYSTEM FOR IMPROVED V/STOL AIRCRAFT PERFORMANCE

CROSS-REFERENCE TO RELATED APPLICATIONS

This is a continuation-in-part application of U.S. Ser. No. 974,589, filed on Dec. 29, 1978, now U.S. Pat. No. 4,301,980; and U.S. Ser. No. 296,710, filed Aug. 27, 1981, now U.S. Pat. No. 4,505,443.

FIELD OF THE INVENTION

This invention relates to vertical and/or short takeoff and landing (V/STOL) airplanes and in particular to an improved method and system (apparatus) for vectoring the aircraft engine exaust flow with a thrust-producing primary nozzle for the major portion of the flow and a bleed-off secondary nozzle means for bleeding-off from the outside of a bend downstream of the propulsion means to eliminate thrust reducing vortices and achieve improved efficiency and performance.

DESCRIPTION OF THE PRIOR ART

In earlier filed application, Ser. No. 974,589, now U.S. Pat. No. 4,301,980, co-pending by way of its divisional application, there was disclosed the same basic invention as in this disclosure and including a preferred arrangement of four flaps located at the rear of each wing-nacelle unit for deflecting the turbofan engine exhaust downward, rearward or at any angle therebetween and this system in combination with a turbine driven fan means and nacelle was claimed. A divisional application Ser. No. 296,710 incorporated and claimed the technology of this application and Ser. No. 974,589 in combination with the use of a shroud to separate the exhaust from the engine, per se, and the exhaust from the propulsion means; such as the turbofan, jet compressor, or the like.

Several types of the so-called V/STOL aircrafts have been proposed. One type, exemplified in U.S. Pat. No. 3,096,954, Bauger et al, uses an articulated cylindrical duct through which a turbofan exhaust is discharged. This type of system has relatively low efficiency due to large losses in turning the exhaust. One loss occurs in the fan exhaust duct on the outside of the turn, where the turning of the exhaust by the nozzle duct wall tends to generate contra-rotating vortices. These vortices can form a blockage in the duct, causing a thrust loss. Also mixing of the fan exhaust with the hot core or turbine exhaust limits the augmentation ratio available because of a requirement to match the pressures of the two streams.

Another proposal is shown in U.S. Pat. No. 3,330,500 to Winborn. In this propulsive wing type, the fan discharge is vectored through lower surface flaps at approximately the mid-cord of the propulsive wing, while the hot turbine exhaust is discharged at the upper trailing edge of the propulsive wing. The discharge of a high energy jet at mid-cord on the lower surface of the wing will cause high suck down forces on the wing and may even be large enough to prevent lift off.

Another disadvantage of design such as the Winborn patent referred to above is in the arrangement of the deflecting flaps for the fan exhaust. Several flaps are spaced across the fan nozzle, forming a cascade and vertically dividing the exhaust stream into several layers. The flaps all pivot downwardly, turning the individual layers of air. The several flaps in the main stream create drag, causing a loss in thrust efficiency. Another disadvantage is that due to their positioning, the total nozzle area varies as the flaps move from the horizontal to the downward positions. The variant can detrimentally affect the thrust during transition positions. Another example of this cascade flap arrangement is shown in U.S. Pat. No. 4,000,868, Gregor.

One manner in which certain types of airplanes having improved lift at low speeds is by bleeding a portion of the jet engine exhaust air or fan air over the upper surface of a wing trailing edge flap. An example of this type system is shown in U.S. Pat. No. 3,920,203 to Moorehead. The high energy sheet of air being discharged delays or prevents boundary layer air flow separation. Boundary layer separation as used in this context refers to the separation of an airstream flowing over an airfoil from the airfoil surface. At and after the point of separation a higher static pressure turbulent area exists between the air stream and the air foil, causing drag and reducing the lifting potential. The high energy sheet of air being ejected over the flap retards or prevents this separation. Also, the jet sheet can induce, by jet pumping action, additional flow over a wing to increase its circulation or lift, this increased circulation being known as supercirculation.

Bleeding a portion of the exhaust over a trailing edge flap has been used, with the energy level of the Jet sheet at moderate levels, to successfully improve the low speed characteristics of conventional takeoff and landing airplanes, as shown in the Moorehead patent.

One proposal, as shown in U.S. Pat. No. 2,879,957, Lippisch, proposes to use the propulsion system to create supercirculation in a V/STOL airplane. One deficiency of the design disclosed therein is that it is unlikely that the sheet of air could exit from the upper slot, since higher pressure air exists on the upper surface of the nacelle. Means would have to be provided to scoop the airflow cut. The Lippisch design also utlizes the high drag cascade system of flaps, and has other disadvantages as well.

During prosecution of the two preceding applications, other United States patents were cited as follows. U.S. Pat. No. 4,222,234, Adamson describes and illustrates a structure showing jets 4 in mid engine with a lobster tail structure aft to allow control of attitude and thrust vectors. This patent relies upon inducing airflow, as can be seen by the arrows entering the duct 19 in that patent. It discharges air into a duct that can be bent, similarly as in the Bauger reference, U.S. Pat. No. 3,096,954 described hereinbefore. What is desirable, in normal sub-sonic flow, as illustrated in FIGS. 3, 4 and 5 of this application is to have the exhaust gas come up off the propulsion means at superatmospheric pressure, keep this pressure high with a low velocity in large diameter passageway, then at the entrance to a turning nozzle start converging the structure to increase velocity to build a high thrust; simultaneously bleeding-off at the outside of any turn to prevent low efficiency contra-rotating vortices. Lift is enhanced and drag is reduced if the bleed-off also flows over lift producing surfaces to increase supercirculation and reduce boundary layer separation. Also, as noted in the above referenced Ser. No. 296,710, efficiency and design flexibility are improved in certain embodiments if the invention also separates engine exhausts and fan exhausts, yet keeps them oriented in the same direction. In the Adamson apparatus, the fan 31 acts as a precompressor to supply air to the core engine and to respective jets on either side thereof. These jets 41 and 47 or 91 are employed for attitude control. Thus the central engine directs its air to jets transversely on either side of the engine, the jets being mounted on an elbow that can be rotated from downward to rearward direction.

U.S. Pat. No. 3,397,854, Reyle, describes essentially a biplane with propellers discharging between the wings for take-off by a heavy atomic fission powered plane. The Reyle patent apparatus does not have a closed conduit duct enclosing each propeller to define a nozzle therefor. In the Reyle patent, the slots 36 (FIG. 7) occur between the flaps when they turn downward "so as to break up the boundary layer of air tending to form along the flap surface" (column 3, line 52). In an open air system such as shown in the Reyle patent, without nozzles for the respective engines, the twin contra-rotating vortices previously mentioned are unlikely to form so there is no function of vortex bleed-off and none is taught.

Other references cited included Netherlands No. 259431 and Great Britain No. 1,450,028. The former, Netherlands Patent No. 259431, uses ejector principle with cascade flap arrangements and suffers the disadvantage discussed hereinbefore with this. The latter British patent No. 1,450,028, describes apparatus in which jet engines are slung under the wings and followed by high mixing nozzle which spreads the jet efflux laterally, but includes flaps that can be lowered into the jet flow to effect a partial downward deflection of the laterally spread exhaust stream. The invention in that British patent is directed oppositely to the invention disclosed herein.

From the foregoing, it can be seen that none of the prior art discloses the combination of a propulsion means capable of producing superatmospheric pressure, an aerodynamic nozzle that is inherently thermodynamically related to the propulsion means and capable of sustaining the superatmospheric pressure even through an included turning means until the exhaust stream is converted to thrust; yet that bleeds off a minor portion of the exhaust gases in the outside of the turning in the turning means to prevent thrust reducing contra-rotating vortices in the turn; directs both the main stream and the bled-off stream in the same vectored direction to recover the thrust of the bled-off stream to produce a high efficiency V/STOL airplane. In particular, the prior art did not provide the foregoing in combination with bleeding-off of the minor portion over airfoil surfaces so as to increase the lift through supercirculation and prevention of boundary layer separation.

SUMMARY OF THE INVENTION

Accordingly, it is an object of this invention to produce a high efficiency V/STOL airplane in which there is employed the method and apparatus having a propulsion means capable of delivering discharge stream at superatmospheric pressure, a nozzle means, including a turning means, in which the major portion of the high pressure discharge gas flow can be directed at a desired vectored angle to produce any flight mode from horizontal to vertical; a bleed-off that successfully bleeds off a minor portion of the stream in the outside of the turn to reduce the formation of contra-rotating vortices and vector both the major and minor portions to flow adjacent each other and along the same vector after discharge so as to increase the efficiency of the total thrust.

It is a particular object of this invention to provide method and apparatus in which the foregoing object is achieved and in which the minor portion of the effluent gas flow is bled-off over airfoil surfaces to increase lift through supercirculation and reduction of boundary layer separation and in which the primary, or major portion of the effluent gases and the bled-off, or minor portion of effluent gases, are vectored in closely adjacent, parallel streams to recover the total thrust potential of the streams.

These and other objects will become apparent from the descriptive matter hereinafter, particularly when taken in conjunction with the appended drawings.

In accordance with one embodiment of this invention, there is provided a method of improving the V/STOL airplane flight characteristics. In the V/STOL in which a higher than ambient static pressure flow of exhaust gas from a power means is turned to effect change between flight modes respectively having greater horizontal and greater vertical thrust vectors, the method improvement comprises the steps of:
  a. directing a major portion of the exhaust gas flow through a closed conduit means to exit through a thrust producing primary nozzle including turning means downstream of the power means;
  b. turning the exhaust flow via the thrust-producing primary nozzle including turning means through an angle from a condition in which the exhaust flow is directed predominately horizontal to a condition in which the exhaust flow is directed predominately downwardly, thereby forming a bend;
  c. bleeding off through at least one secondary nozzle a second and minor portion of the exhaust flow from an outer portion of the bend downstream of the bend leading edge to reduce vortex formation in the bend; and directing the bleed-off and the exhaust flow adjacent each other and oriented in the same direction after discharge in all modes for recovery of the thrust potential in all flight modes such that maximum thrust is effected in all flight modes by eliminating contra-rotating vortices and achieving high efficiency in the exhaust and turn and by recovering the thrust potential of the bled-off portion.

In accordance with another embodiment of this invention, there is provided a propulsion system providing enhanced thrust and airplane handling qualities in a vertical and/or short take off and landing (V/STOL) aircraft through more efficient turning of its exhaust between horizontal and upward directed flight modes comprising:
  a. propulsion means for generating a higher than ambient static pressure flow of thrust producing exhaust gas;
  b. propulsion means exhaust nozzle means including turning means for directing a major portion of the exhaust gas flow from a propulsion means to the airplane exterior and for turning the flow between substantially horizontal and substantially downwardly directed flow positions;
  c. the propulsion exhaust nozzle means including turning means comprising:
    i. primary thrust nozzle means for exit of a major portion of the exhaust gas flow, and
    ii. secondary thrust nozzle means for bleeding off a minor portion of the exhaust gas flow;
  said secondary thrust nozzle means being positioned to effect a bleed-off of a minor portion from the combined minor and major portions of the exhaust gas flow downstream of the commencement of the turn and within the turn so as substantially to prevent formation of dynamic pressure-induced contra-rotating vortices in the outside of the turn, thereby substantially preventing thrust reducing contra-rotating vortex formation in the gas flow therewithin; and d. said secondary thrust nozzle means being directionally movable so as to direct the bleed-off to flow closely parallel to the major portion of the exhaust flow at all positions thereof, whereby the bleed-off is turned together with the major portion of the exhaust flow, effectively to provide a coherent unitary exhaust stream passing from the airplane at all angles of flow from horizontal to downward flow; thereby maximizing both the thrust from the major portion of the flow and the recovery of thrust from the bleed-off flow and improving the handling qualities of the airplane at all positions of turning of the gas flow.

Specifically, it has been found that more efficient V/STOL aircraft flight can be achieved by providing a nacelle forming an airfoil, with an engine exhaust nozzle formed by a system of trailing edge flaps providing both gain, or primary, and auxiliary, or secondary, exhaust nozzles in which one of the flaps is at the trailing edge of one of the airfoil surfaces; for example, the lower; in one principle flight position; for example, horizontal; and is repositionable to form the trailing edge of the other; for example, upper; airfoil surface in the other principle flight position; for example, vertical; as the exhaust nozzles are directed between horizontal and vertical flight positions. Such flap can thus be shifted between positions in which it may be optionally be a part of either the "upper" or "lower" surfaces of the airfoil depending upon the direction of the nozzle thrust with total nozzle area remaining substantially constant for all nozzle directions. In horizontal and vertical flight conditions, the nozzles are effectively fully opened and unobstructed. If desired, the total nozzle area may be made variable according to predetermined aircraft or propulsion means operating requirements.

It will be apparent that the bleed-off of a portion of the flow from the outer area of the bend in a conduit for the advantages described above, e.g., to reduce or eliminate flow-impeding vortices, can be applied to the flow from a turbojet engine as well as to turbofan engine flow(s) whether the latter engine be high or low by-pass ratio and whether or not the core and fan flows therefrom are re-combined prior to passing through the nozzle. Bleed-off may be taken of any of the flows at only one or at sequential, e.g., tandemly arranged, locations along the bend in the direction of flow and whether the flow or flows is/are turned by deflection of flaps or by other means, such as retractable or rotating "lobster tail" or "baby buggy" hood type exhaust flow turning nozzles intended to be used on V/STOL aircraft. In the latter type nozzles flow is turned by visor-like, hood-like or scoop-like deflector means or "buckets" in which case exhaust bleed-off to reduce vortex formation can be through slit-like apertures or elongated slots extending through the bucket portion of the conduit generally transverse to the flow direction in the region of the outside of the bend and the buckets can have sufficient thickness to form the slots as nozzles for recovery of thrust and supercirculation.

BRIEF DESCRIPTION OF THE DRAWINGS

FIG. 10 is a representational view in perspective of an alternate embodiment of the invention showing a rectangular shaped exhaust nozzle, with variable ramp, receiving an exhaust gas flow from a nacelle-mounted engine, which can be a turbojet or a low by-pass ratio turbofan engine, and the flow is turned down by a retractable visor-like baby-buggy hood or "bucket" deflector means having elongated, slot-like bleed-off nozzles extending therethrough just downstream of the turn or bend in the flow.

FIG. 11 is a cross-sectional view in elevation of the embodiment of FIG. 10 taken along line 11—11 thereof showing in broken lines positions of the ramp, flow turning deflector means and a lower flap.

FIG. 12 is an enlarged cross-sectional view of detail "A" of FIG. 11 showing the nozzle configuration of the exhaust bleed-off slots for thrust recovery and supercirculation, the arrows indicating exhaust gas flows and the Coanda effect.

DESCRIPTION OF PREFERRED EMBODIMENT(S)

Figure 1:
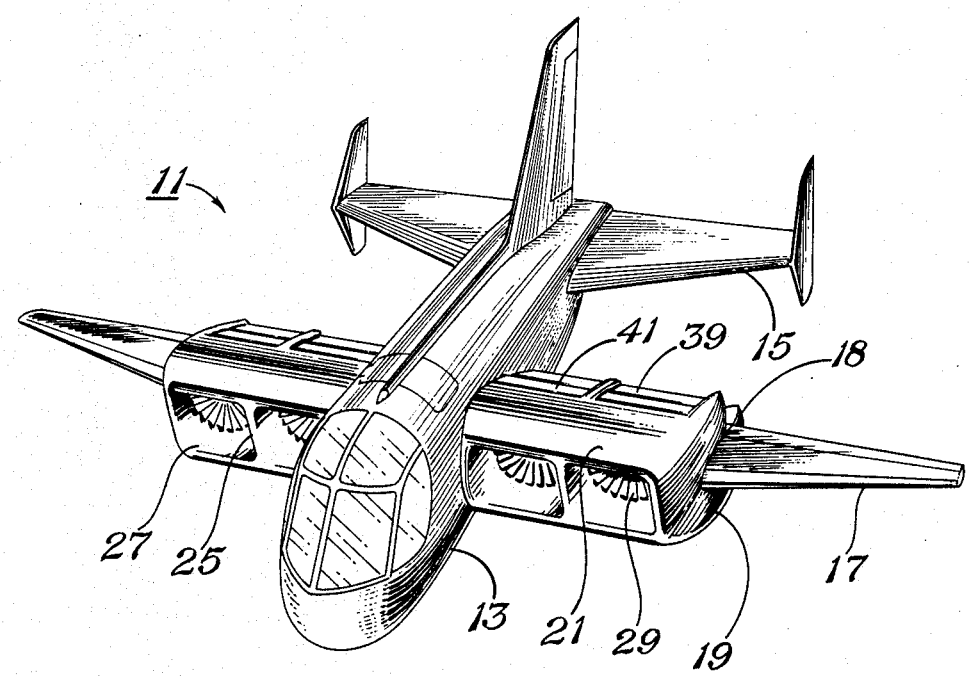
FIG. 1 is a perspective view of an airplane constructed in accordance with one embodiment of this invention.
Figure 2:
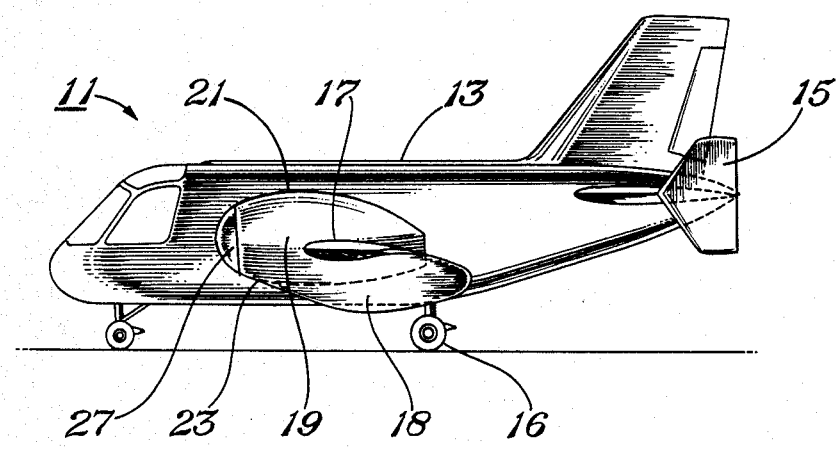
FIG. 2 is a side elevational view of the airplane of FIG. 1.
Figures 3, 4, 5:
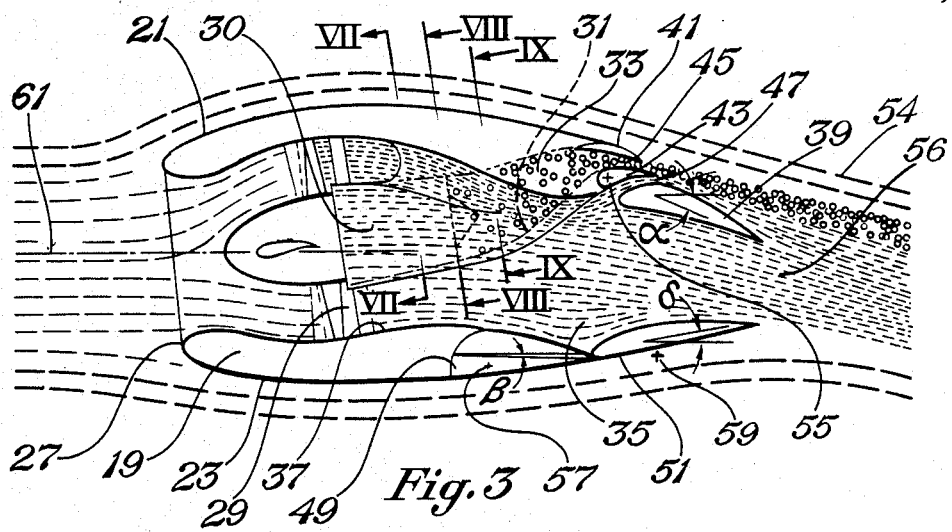
FIG. 3 is a schematic cross-sectional view of the airplane of FIG. 1, taken along the lines III—III of FIG. 6, with the propulsion system shown in the horizontal flight mode.
FIG. 4 is a schematic view of the propulsion system, similar to FIG. 3, but showing a propulsion system in a transitional flight mode.
FIG. 5 is a schematic view of the propulsion system, also similar to FIG. 3, but showing the propulsion system in a vertical flight mode.
Figure 6:
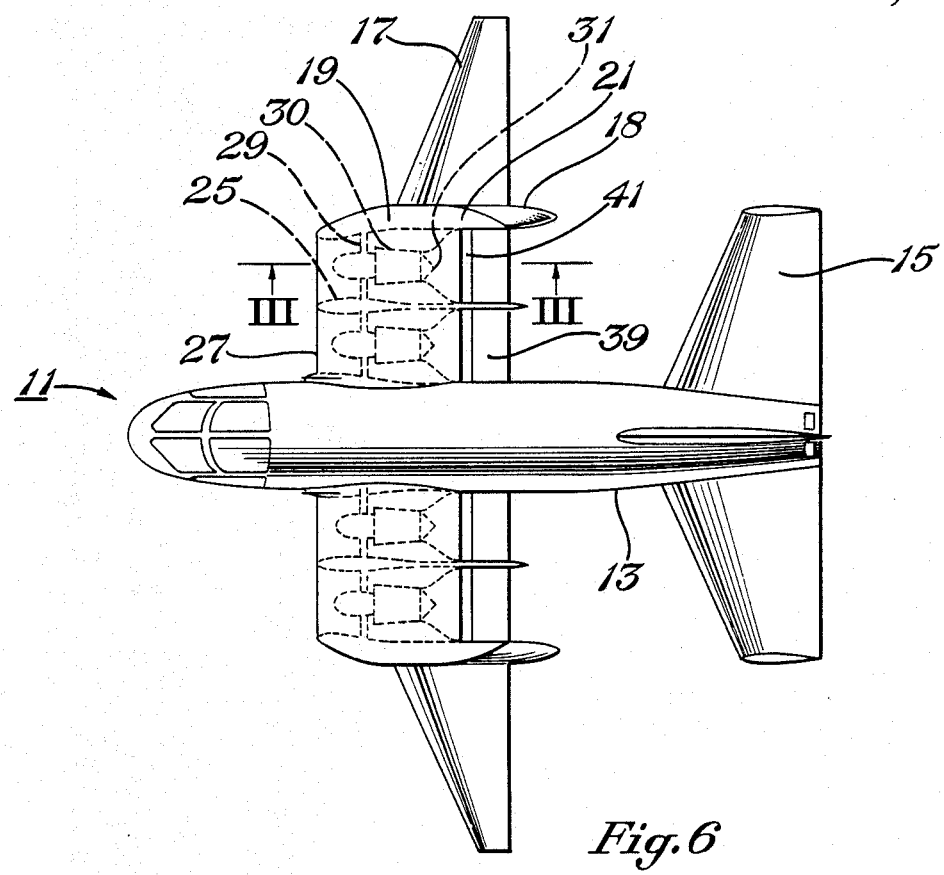
FIG. 6 is a top view of the airplane of FIG. 1.

Airplane 11, shown in FIGS. 1, 2 and 6 has a fuselage 13 and tail section 15 of the general configuration common to many types of airplanes. As shown in FIG. 2, the main landing gear 16 folds inside a compartment 18 under each wing 17 during flight. Each wing 17 extends laterally from a pair of wing/nacelles 19 hereafter called nacelles. There are two nacelles, each mounted on a respective opposite side of the fuselage 13. Nacelles 19 have an upper surface 21 and a lower surface 23. These surfaces are curvilinear when viewed in a longitudinal vertical section, as shown in FIGS. 3-5, but generally straight when viewed in a vertical lateral section, as shown partially in FIGS. 7-9. The upper surface 21 and lower surface 23 of each nacelle 19 serve as upper and lower surfaces of a ducted airfoil.

Within each nacelle 19, a vertical partition 25 separates the nacelle into two compartments. Each compartment has a generally rectangular inlet 27. The nacelle outlet or nozzle is also rectangular. The power means for forcing air through nacelle 19 comprises a turbofan engine, having a fan 29 and turbine engine 30 housed in each compartment. Each turbofan engine is a high bypass ratio, low fan pressure ratio engine of generally conventional design. The fan pressure ratio is preferably about 1.2 to 1.8 and the nozzle pressure ratio is approximately the same, thus producing a higher than ambient static pressure of thrust-producing exhaust gas.

Figure 7:
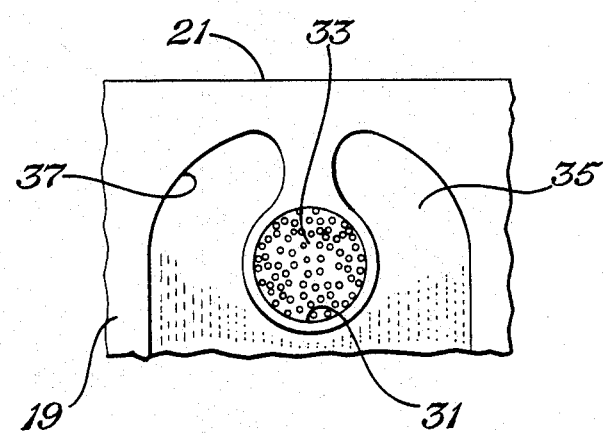
FIG. 7 is a fragmentary and schematic cross-sectional view of the propulsion system of FIG. 3, taken along the lines VII—VII of FIG. 3.
Figure 8:
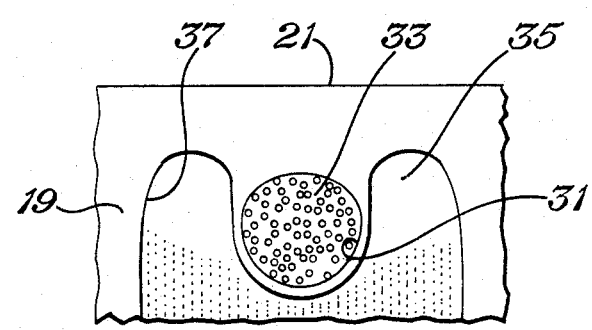
FIG. 8 is a fragmentary and schematic cross-sectional view of the propulsion system of FIG. 3, taken along the lines VIII—VIII of FIG. 3.
Figure 9:
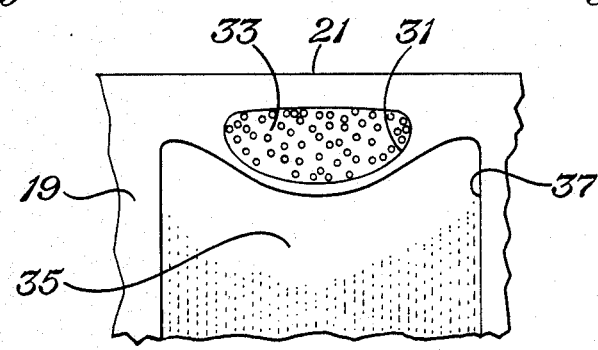
FIG. 9 is a fragmentary schematic cross-sectional view of the propulsion system of FIG. 3 taken along the lines IX—IX of FIG. 3.

Referring to FIGS. 3-5 and 7-9, a shroud 31 is attached to the rear of the turbine engine 30 and extends rearward. As shown also in FIG. 6 in phantom, shroud 31 commences at the turbine engine exit as a cylindrical duct, gradually flattening as it proceeds to the rear. At the trailing edge of the nacelle upper surface 21, the passage formed by shroud 31 is in a general rectangular shape of width greater than height. Shroud 31 contains all of the hot exhaust from the turbine engine 30, indicated in FIGS. 3-5 as 33. Exhaust air from the fan 29, indicated in FIGS. 3-5 as 35, passes through the interior 37 of nacelle 19. As shown in FIG. 7, forward of the commencement of shroud 31, the fan exhaust 35 passes around the housing for turbine engine 30, being split at the top by a portion of the housing connected to the nacelle interior surface 37. Further downstream, as shown in FIG. 9, the fan exhaust 35 passes beneath the shroud 31.

Referring to FIGS. 3-5, a plurality of flaps are pivotally secured to the nacelle outlet for vectoring the exhaust by turning it between a horizontal flight position and a vertical flight position. An upper flap 39 is mounted adjacent the trailing edge of the nacelle upper surface 21. Flap 39 is pivotal from the position shown in FIG. 3 to that shown in FIG. 5, and is in the shape of an airfoil. Flap 39 includes a pair of vanes 41, 43 rigidly secured to the upper leading edge of flap 39. Vane 41 is considerably shorter in chord length than flap 39 and is sealed against the trailing edge of the nacelle upper surface 21. Vane 41 moves against this trailing edge while pivoting from the position shown in FIG. 3 to that shown in FIG. 5. Vane 43 is mounted between flap 39 and vane 41, and is also considerably shorter in chord length than flap 39. An upper nozzle or slot 45 exists between vanes 41 and 43. An intermediate nozzle or slot 47 exists between vane 43 and flap 39. Vane 41 leads vane 43 slightly, and vane 43 leads flap 39. Shroud 31 terminates at the upper slot 45. Intermediate slot 47 recives a portion of fan exhaust 35, discharging it over the upper surface of flap 39. Engine turbine exhaust 33 is discharged from upper slot 45, also over the upper surface of flap 39. Vanes 41 and 43 should be considered as integral parts of flap 39 and pivot directly with it. Slots 45 and 47 should be considered to be found in the leading edge of upper flap 39. Vanes 41, 43 serve to more efficiently turn a portion of the fan exhaust and engine turbine exhaust as it exits from slots 45 and 47 respectively and flows over the upper surface of flap 39.

A lower flap 49 is pivotally mounted to the nacelle lower surface 23. Flap 49 is in the shape of an airfoil and pivots from the position shown in FIG. 3 to that shown in FIG. 5. An intermediate flap 51 is pivotally mounted to the nacelle 19 Intermediate flap 51 is in the shape of an airfoil and is pivotal from the position shown in FIG. 3 to that shown in FIG. 5. In the position shown in FIG. 5, a lower slot 53 is formed between the leading edge of intermediate flap 51 and the trailing edge of upper flap 39. Fan flow out slot 53 tends to energize the flow over flap 39 and effect efficient flow turning over the external surface of flap 51.

Each compartment within each nacelle 19 has a separate and identical set of flaps. The width of the flaps and the vertical distance across the nacelle outlet are selected to provide a high aspect ratio opening at slots 45 and 47. That is, the width is much greater than the height.

In operation, in the horizontal flight position as shown in FIG. 3, upper flap 39, along with its vanes 41, 43, is generally aligned with the nacelle upper surface 21. That is, flap 39 continues the airfoil upper surface at generally the same rate of curvature as contained on the trailing portion of the nacelle upper surface 21. Upper flap 39 forms the trailing edge of the airfoil upper surface in this position. Hot engine turbine exhaust 33 is ducted through shroud 31 to the upper slot 45. A portion of the fan exhaust is discharged through the intermediate slot 47. The discharges through these slots retard boundary layer separation on the flap external surfaces and increase flow over the wing/nacelle by jet pumping action, as shown by the longer dashed lines 54 in the drawing. In this position, lower flap 49 and intermediate flap 51 are generally aligned with the nacelle lower surface 23. They continue the airfoil lower surface at generally the same rate of curvature that exists on the trailing portion of the nacelle lower surface 23. Upper flap 39 and intermediate flap 51 define a horizontal flight main thrust nozzle 56 through which the majority of the fan exhaust 35 is discharged. In the horizontal flight position, no additional flaps are located in the horizontal flight main thrust nozzle 56, avoiding unneccessary drag. In the horizontal flight position, the trailing edges of upper flap 39 and intermediate flap 51 are in approximately the same vertical plane. The height of the horizontal flight main thrust nozzle 56 is approximately one-half its width.

FIG. 4 illustrates a transition and STOL position. The pivoting of the flaps from the position shown in FIG. 3 to that shown in FIG. 5 is continuous with no automatic stop, thus the position shown in FIG. 4 is one of an infinite number of transition positions. In the position shown in FIG. 4, upper flap 39 has turned downwardly, turning along with it its vanes 41 and 43, as can be seen as referring to reference pivot point 55. Lower flap 49 has turned downward slightly, although not noticeable by reference to its reference pivot point 57. Intermediate flap 51 has moved away from the lower flap 49 and now splits the majority of the fan exhaust 35 into two separate flow streams, as shown by its reference pivot point 59. Lower flap 49 now becomes the trailing edge of the airfoil lower surface. Both the turbine engine exhaust 33 and fan exhaust 35 incline downward and combine after passing through the nozzles formed by the flaps.

The vertical, or upward, flight position, used for vertical or sharply angled takeoff and landing, is shown in FIG. 5. In this position, upper flap 39 and its vanes 41, 43 remain in approximately the same position, as shown in FIG. 4 with only a small amount of additional movement. Lower flap 49 turns downward to a greater degree. Note that the upper surface of lower flap 49 and the lower surface of the nacelle interior 37 form a large radius of curvature to promote turning efficiency. Intermediate flap 51 has pivoted downward further and now has positioned itself to become a part of the airfoil upper surface. Intermediate flap 51 and lower flap 49 define a vertical flight main thrust nozzle 58 that discharges the majority of the fan exhaust 35. All of the engine turbine exhaust 33 continues to discharge through the upper slot 45. A portion of fan exhaust 35 discharges through the intermediate slot 47, and another portion through lower slot 53. Air flowing through these three slots or nozzles helps prevent separation of the stream of air 54 flowing over the airfoil upper surface and induces supercirculation or jet pumping of air over the wing. Discharge of a minor portion of the fan exhaust 35 at the outside of the turn through slots 47 and 53 prevents the internal formation of thrust destroying contra-rotating vortices. The thrust potential of the portion of fan exhaust 35 that is bled through slots 47 and 53, and the turbine exhaust 33 through slot 45, is recovered by jet nozzles formed at the slot exits. The flaps are positioned so that the engine turbine exhaust 33 combines with the fan exhaust 35 after exiting through the upper slot 45. In the vertical flight position, the trailing edges of the intermediate flap 51 and lower flap 49 are substantially in the same horizontal plane. The height of the vertical flight main thrust nozzle 58 is approximately one-half its width.

The sum of the areas of slots 45, 47 and horizontal flight main thrust nozzle 56 equals the sum of the areas of slots 45, 47, 53 and vertical flight main thrust nozzle 58. Also, these sums equal all of the sums of the areas of slots 45, 47 and the streams of fan air 35 on both sides of intermediate flap 51 for all transition positions. The total nozzle area normally remains constant through all positions, maintaining a constant power match between fan 29 and turbine engine 30. If desired, the total fan nozzle area can be varied in flight according to a predetermined schedule, however, by independently moving certain of the flaps, as a means for thrust control.

In the preferred embodiment, the engine turbine exhaust 33 will comprise only approximately 13% of the total exhaust flow. About 10% of the fan exhuast 35 is discharged through intermediate slot 47, regardless of the flap positions. In the vertical flight position, an additional portion, approximately 5%, of the fan exhaust 35 is discharged through the lower slot 53.

The degree of pivot of the flaps may be determined with reference to the longitudinal axis 61 of the aircraft. For reference purposes, the angle of inclination of the flaps with respect to the axis 61 is determined herein by drawing a line from the trailing edge of each flap through the approximate center of thickness of each flap. Angle $\alpha$ represents the angle between this center line and the longitudinal axis 61 for upper flap 39. Angle $\beta$ represents the same angle measurement for the lower flap 49, and angle $\delta$ represents the same angle measurement for the intermediate flap 51. In the horizontal flight position, shown in FIG. 3, angle $\alpha$ is approximately negative 23 degrees, angle $\beta$ is approximately negative 3 degrees, and angle $\delta$ is approximately positive 8 degrees. In the transition position shown in FIG. 4, angle $\alpha$ has changed to approximately negative 52 degrees, angle $\beta$ to approximately negative 8 degrees, and angle $\delta$ to approximately negative 46 degrees. In the vertical flight position, shown in FIG. 5, angle $\alpha$ is approximately negative 60 degrees, angle $\beta$ is approximately negative 63 degrees, and angle $\delta$ is approximately 110 degrees. Consequently, between the horizontal and vertical flight positions, the upper flap 39 pivots a total of approximately 37 degrees, the lower flap 49 pivots a total of approximately 60 degrees and the intermediate flap 51 pivots a total of approximately 118 degrees.

It should be apparent that an invention having significant improvements has been provided. The propulsion system with its system of flaps permits design of a highly efficient vertical and short takeoff and landing airplane. The discharge of high energy air over the upper surface flaps retards boundary layer separation and induces supercirculation around the airfoil. The flaps are located so that during horizontal flight and in vertical flight, the main thrust nozzles 56 and 58 are free of drag creating intermediate flaps. The slots 47 and 53 provided in the vertical flight position bleed-off air to prevent internal vortices being formed by the fan exhaust air stream being turned by the internal nozzle wall, making turning of the exhaust highly efficient. Separating the engine turbine exhaust from the fan exhaust promotes higher propulsion system augmentation ratio by avoiding the interaction of two streams of different pressures.

It will be apparent from the foregoing, (see especially FIGS. 3, 4 and 5) that the main, or primary thrust nozzle means (56 or 58; or the combination of the nozzles respectively between flaps 39–51 and 51–49; that is, between flaps 39 and 49, in transitional flight) discharge a primary or major portion of the exhaust or exhaust gas flow. Since the primary thrust nozzle is, as the name implies, a thrust-producing nozzle, it is inherently thermodynamically interrelated with the propulsion means. Expressed otherwise, its design and operation can affect the temperature of the propulsion means. Likewise jet or thrust nozzle means 47 in horizontal and transitional flight (that is, more upward or downward angled) flight and jet or thrust nozzle means 47 and 53 in vertical or upward and downward flight are secondary in discharging a minor or bleed-off portion of the exhaust gas flow. Auxiliary nozzle 45, and the exhaust exiting from it that comes from the engine core or turbine, may be considered part of the primary thrust nozzle means and the major portion of the exhaust gas flow respectively, all of the referred two nozzles taken together in making up the exhaust nozzle means for the exit of the exhaust from the airplane.

It can be seen that turning of the exhaust commences immediately downstream of the fan discharge. Thus, those skilled in the art, from the attention to the drawings and text, will realize that an internal build up of dynamic pressure will begin to occur in the vicinity of the outside wall of the turn due to the impingement of the gas against the outer walls of the turn, and that this build-up tends to cause the thrust reducing contra-rotating vortices to form in the flow. These will be relieved or prevented, however, in that the slot or nozzle 47 is positioned to effect bleed-off downstream of the leading edge or commencement of the turn; that is, where the obstruction to flow resulting from the build-up tends to occur and will be relieved or prevented again by nozzle 53 downstream thereof where like obstruction may reoccur for like reasons.

It can also be clearly seen in the drawings that the auxiliary thrust nozzle 45 and secondary thrust nozzle means (slots 47 and 53) are tandemly arranged along the turn and respectively direct the engine core (turbine) exhaust and the bleed-off exhaust substantially tangentially to and over the curved lifting surfaces formed by the flaps, with the core exhaust close above the bleed-off, i.e., the bleed-off between the core exhaust and downstream flap surfaces. These flows individually and together induce supercirculation over the nacelle and retard boundary layer separation therefrom during horizontal and upward angled flight. It is further apparent that such auxiliary thrust nozzle and secondary thrust nozzles are directionally movable so as to direct the core exhaust and bleed-off to flow generally parallel and close to the major portion of the exhaust flow at all positions of flow whereby the core exhaust and bleed-off are turned together with the rest of the major portion of the exhaust flow to provide, in its effect, a substantially unitary or coherent exhaust stream passing from the airplane horizontally and it all turning angles between horizontal and downward flow, i.e., between horizontal and upward flight positions. (See FIGS. 3, 4 and 5).

As is clear from the drawings each of the nozzles at all postions of turning or to which directed for exhaust of the gas flow, has its nozzle constriction or throat positioned so as to be maintained it all times substantially at and forming (i.e., coincides with) the nozzle exit plane unless purposely varied therefrom as indicated above. The effect is to produce the maximum of velocity and thus thrust from the exiting flow or stream of the exhaust gases and to cause turning of all of the exiting exhaust flow through the maximum angle with the maximum velocity thereby enhancing total thrust in all modes of flight and producing the coherent flow.

Expressed otherwise and as shown in the drawings, the turning of the exhaust flow is completed in the superatmospheric pressure region of the nozzle; that is, upstream of the nozzle exit plane; for achieving maximum velocity in the desired directions at the nozzle exit plane for achieving maximum thrust.

From FIGS. 10–12, it can be seen that bleed-off of a portion of the flow from the outer area of a bend and in other embodiments such as in the alternate embodiment of FIG. 10; for example, to reduce or eliminate flow-impeding vortices, can be done at any of one or more locations; such as by slots 65, FIGS. 10–12, in the "baby buggy" hood type exhaust flow turning nozzle 67. These are effective whether the flow is undivided from a jet engine 69, as illustrated in FIGS. 10–11, or has divided or undivided flow from a turbofan engine with either high or low by-pass ratio. The lower flap 49 is the same as that described earlier hereinbefore and operates in conjunction with the extending and retraction of the hood nozzle 67 and movable ramps 70 and 71, similarly as described earlier herein in other embodiments.

While the invention has been shown in only a limited number of its forms, it should be apparent to those skilled in the art that it is not so limited but is susceptible to various changes and modifications without departing from the spirit thereof.

What is claimed is:

1. In a V/STOL airplane in which a higher than ambient pressure, including both static and dynamic pressure, flow of exhaust gas from a power means is turned to effect the change between flight modes respectively having greater horizontal and greater vertical thrust factors, the mode of improving airplane flight characteristic which comprises:
   a. directing a major portion of said exhaust gas flow through a closed conduit means to exit through a thrust-producing primary nozzle that includes a nozzle exit plane at the end of a converging nozzle section and includes turning means downstream of the power means and within a superatmospheric region of higher than ambient pressure extending from immediately downstream of the power means to said nozzle exit plane,
   b. turning the exhaust flow via said thrust producing primary nozzle including turning means to an angle from a condition in which the exhaust flow is directed predominantly horizontally to a condition in which the exhaust flow is directed predominantly downwardly, thereby forming a bend;
   c. bleeding off through at least one secondary nozzle a second portion of the exhaust flow from an outer portion of the bend downstream of the bend leading edge to reduce vortex formation in said bend;
   d. directing the bleed-off exhaust flows adjacent each other and oriented in the same direction in all flight modes for recovery of the thrust potential in all flight modes;
whereby maximum thrust is effected in all flight modes by eliminating contra-rotating vortices and achieving high efficiency in the exhaust and turn of the exhaust gas from the power means in a superatmospheric region and by recovering the thrust potential of the bled-off portion.

2. The method of claim 1 wherein said second portion is directed over a portion of an air foil upper surface substantially tangent thereto at all positions of bending of the flow for thrust recovery and to improve lift by supercirculation thereover and reduce boundary layer separation.

3. The method of claim 1 in which the bled-off portion is thrust producing and directionally movable.

4. The method of claim 3 in which the flow direction of the bled-off portion is continuously changed concomitantly to the bend to effect supercirculation and reduce boundary layer separation of the air moving over the air foil upper surface through all angles of bend.

5. The method of claim 1 in which the bled-off portion is effected at a plurality of secondary nozzles tandemly arranged at a plurality of locations along the outer portion of the bend, all said gas flows being maintained adjacent one another and similarly oriented as is the main flow from the primary nozzle exit.

6. A propulsion system providing enhanced thrust and airplane handling qualities in a vertical and/or short takeoff and landing (V/STOL) aircraft through more efficient turning of its exhaust between horizontal and upward directed flight modes comprising:
   a. propulsion means for generating a higher than ambient total (static and dynamic) pressure flow of thrust producing exhaust gas;
   b. propulsion means exhaust nozzle means that includes a nozzle exhaust plane at the end of a converging nozzle section and that includes turning means downstream of the power means and within a superatmospheric region extending between said propulsion means and said nozzle exit plane at said end of said coverging nozzle section for directing a major portion of said exhuast gas flow from the propulsion means to the airplane exterior, and for turning the flow between substantially horizontally and downwardly directed flow positions;
   c. said propulsion exhaust nozzle means including turning means comprising:
      i. primary thrust nozzle means for exit of a major portion of said exhaust gas flow, and
      ii. secondary thrust nozzle means for bleeding off a minor portion of the exhaust gas flow; said secondary thrust nozzle means being positioned to effect the bleed-off of said minor portion from combined said minor and said major portions of the exhaust gas flow downstream of the commencement of the turn therein so as substantially to prevent formation of dynamic pressure-induced contra-rotating vortices in the outside of the turn, thereby substantially preventing thrust reducing contra-rotating vortex formation in the gas flow therein; and d. said secondary thrust nozzle means being directionally movable so as to direct the bleed-off to flow closely parallel to the major portion of the exhaust flow at all positions thereof whereby the bleed-off is turned together with the major portion of the exhaust flow, effectively to provide a coherent unitary-like exhaust stream passing from said airplane at all angles of flow from horizontal to downward flow; thereby maximizing both the thrust from said major portion of the flow and the recovery of thrust from said bleed-off flow and improving the handling qualities of the airplane at all positions of turning of the exhaust flow.

7. The propulsion system of claim 6 in which at least one of said primary thrust nozzle means and said secondary thrust nozzle means are in the form of elongated slot means.

8. The propulsion system of claim 7 in which said secondary thrust nozzle means comprises a plurality of said respective slot means and flap means that are tandemly arranged at successive locations spaced apart along the turn in the exhaust gas flow so that internal vortex formation is avoided along substantially the full extent of the turn at all positions of turning of the flow.

9. The propulsion system of claim 7 in which said secondary thrust nozzle means comprises a plurality of slot means that are formed by a tandemly arranged series of movable flap means providing lifting surfaces for said airplane and in which said bled-off exhaust flow is directable over at least some of said lifting surfaces substantially tangent thereto to retard boundary layer separation during horizontal and transitional flight positions and to enhance the turning of said bled-off exhaust flow together with said major portion of the exhaust gas flow.

10. The propulsion system of claim 9 in which said slot means are positioned adjacent at least other lifting surfaces of said airplane whereby said bled-off exhaust flow induces supercirculation over said other lifting surfaces for increased lift capability in said airplane.

11. The propulsion system of claim 10 wherein said other lifting surface is a nacelle.

12. The propulsion system of claim 6 in which at least one of said primary thrust nozzle means and said secondary thrust nozzle means are formed by at least one movable flap means.

13. The propulsion system of claim 12 in which said at least one movable flap is an airfoil.

14. The propulsion system of claim 6 in which said propulsion means exhaust nozzle means optionally provides a constant or a variable nozzle area at the nozzle exit at all positions of nozzle turning.

15. The propulsion system of claim 6 wherein said propulsion means exhaust nozzle means including turning means includes a flap means located in a portion of the airplane to form a thrust-producing nozzle for the gas emitted from the propulsion means, said flap means being movable to direct the flow of gas between horizontal and upward flight modes, said flap means being capable of forming a thrust nozzle capable of sustaining said superatmospheric pressure upstream of its exit in all positions;

slot means being formed adjacent the leading edges of selected flap means to bleed-off a portion of the exhaust so as to minimize the formation of thrust inhibiting vortices in the turning exhaust during transitional and vertical flight, thus increasing the thrust efficiency of the vectored exhaust flow;

said flap means and slot means forming a series of movable and directional, thrust-producing nozzles to vector a portion of the exhaust incrementally over the upper surfaces of flap means to induce supercirculation over adjacent lifting surfaces and prevent boundary layer separation therefrom during horizontal and transitional flight;

said thrust nozzle flap means and said thrust nozzle slot means being effective to turn the exhaust progressively between desired positions from horizontal to vertical flight positions.

16. The propulsion system of claim 15 in which the throat of each nozzle means is respectively maintained at the exit plane of each such nozzle means at all flight positions and at all positions of turning from horizontal to downwardly directed flow.

17. The propulsion system of claim 15 in which the total nozzle area at said exit plane optionally remains constant or is variable through all positions of nozzle turning.

18. The propulsion system of claim 6 wherein there is provided also:

a nacelle with said propulsion means being located in said nacelle:

a plurality of flaps located in a rearward portion of the nacelle to form a thrust nozzle including a turning means for the exhaust from said propulsion means, said flaps being movable between horizontal and upward flight positions;

a plurality of slots serially arranged along adjacent leading edges of selected flaps, at least one such slot being effective to cause said bleed-off of a portion of the exhaust over the upper surfaces of selected flaps to induce supercirculation and prevent boundary layer separation during horizontal and transitional flight;

said slots during transitional and upward flight, due to bleed-off, minimizing the formation of counter-rotating vortices in the turning exhaust thus increasing the thrust efficiency of the vectored exhaust;

the flaps and slots forming a series of movable and directional thrust nozzles to incrementally vector the bleed-off along the upper surfaces of selected flaps and said turning means serving to turn the exhaust progressively downward for upward flight.

19. The propulsion system of claim 18 in which said exhaust is turnable at least 90° thus providing for said airplane to achieve substantially vertical flight.

20. The propulsion system of claim 18 in which a portion of said exhaust is turnable up to about 118°.

21. The propulsion system of claim 6 further comprising:

said propulsion means located in said airplane;

flap means located in a portion of the airplane downstream of said propulsion means to form a thrust nozzle including turning means for the exhaust from said propulsion means and being movable to direct the exhaust between horizontal and vertical flight positions;

said flap means being capable of forming said primary thrust nozzle means capable of sustaining said superatmospheric pressure upstream of its exit in all positions;

slot means formed by adjacent leading and trailing edge portions of selected flap means to bleed-off portion of the exhaust over the upper sufaces of the flap means to induce supercirculation over adjacent surfaces and prevent boundary layer separation during horizontal and transitional flights;

said slot means during transitional and vertical flight, due to the bleed-off, minimizing the formation of counter-rotating vortices in the turning exhaust thus increasing the thrust efficiency of the vectored exhaust;

said slot means forming series of movable and directional thrust nozzles to vector the bleed-off of the exhaust incremetally along upper surfaces of the flap means and said turning means serving to turn the exhaust from the slot means progressively 90° for vertical flight.

22. The propulsion system of claim 6 further comprising: wherein said propulsion nozzle means including turning means comprising said primary thrust nozzle means for exit of a major portion of said exhaust gas flow comprises a retractable hood type exhaust flow turning nozzle that can be extended to effect a desired angle of thrust between a straight rearward thrust in the fully retracted position to a straight downward, or vertical takeoff, thrust in the fully extended position; and wherein said secondary thrust nozzle means for bleeding off a minor portion of the exhaust gas flow comprises elongated slots traversing laterally of said hood-type exhaust flow turning nozzle.

23. The propulsion system of claim 22 wherein said hood-type exhaust flow turning nozzle defines the outer extremity of the turn and a pivotally mounted flap defines the inner extremity of said turn; said flap being movable to a desired angle of thrust between a straight rearward thrust when said hood-type exhaust flow turning nozzle is in the fully retracted position to a straight downward thrust when said hood-type exhaust flow turning nozzle is in a fully extended, or 90°, position; and wherein an internal ramp sidewall operates in conjunction with said flap between a downward position to define a nozzle when said flap is extended straight rearwardly into an upward retracted position when said flap is turned downwardly at 90° to the longitudinal axis of said flow path upstream of said nozzle including turning means.

* * * * *